(No Model.)

C. H. BRYAN.
ELECTRIC BATTERY.

No. 489,668. Patented Jan. 10, 1893.

Witnesses:
Inventor:
Clarence H. Bryan

UNITED STATES PATENT OFFICE.

CLARENCE H. BRYAN, OF CHICAGO, ILLINOIS.

ELECTRIC BATTERY.

SPECIFICATION forming part of Letters Patent No. 489,668, dated January 10, 1893.

Application filed May 3, 1892. Serial No. 431,715. (No model.)

*To all whom it may concern:*

Be it known that I, CLARENCE H. BRYAN, a citizen of the United States, residing at Chicago, in the county of Cook and State of Illinois, have invented a new and useful Improvement in Electric Batteries, of which the following is a specification.

My invention relates to an improvement in the class of electric batteries known as "dry" batteries, in contradistinction to such batteries as require a liquid for the excitant, and not because the dry batteries are necessarily devoid of moisture.

The object of my improvement is to provide a dry battery which shall generate a steadier current and, for any given size of the battery, one of longer duration than other batteries, and the exciting material of which shall be such as to decompose slowly when the circuit is closed, and not to decompose at all, or appreciably, when it is open, thereby rendering the battery exceptionally durable and reliable.

I have discovered that the aforesaid desirable properties in a battery are afforded by an excitant composed of a mixture of some salt of calcium with some ferrous salt and some salt of hydrargyrum. I believe, however, that the best results are obtained by the sulphate of each of the enumerated chemicals, though the chloride thereof also produces good results.

To provide my preferred mixture, I use the following-named ingredients in the proportions, or substantially the proportions, specified: sulphate of calcium, (ordinary plaster of paris) about five parts, by measure; ferrous sulphate, about six parts, by measure; and hydrargyrum bi-sulphate, about one-half part, by measure. These are mixed together and with sufficient water to reduce the mixture to a plastic condition, which dries out with time, leaving a hardened mass.

The plaster of paris ingredient serves the purpose of affording a body for the other active ingredients.

I employ the foregoing compound as the excitant in a battery, a desirable form of which is that illustrated in the accompanying drawings, in which—

Figure 1:
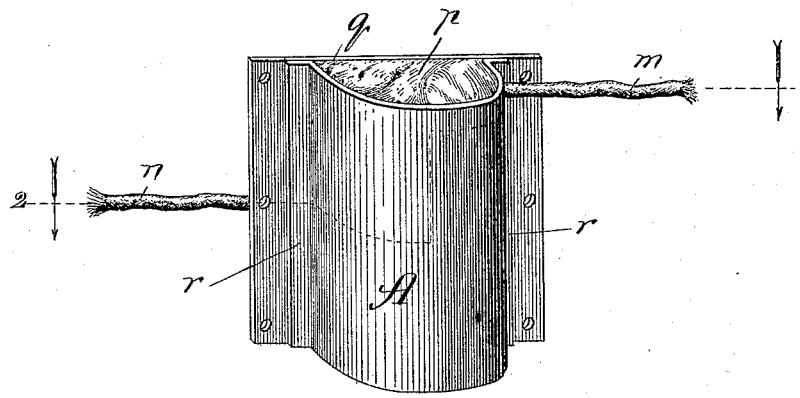
Figure 2:
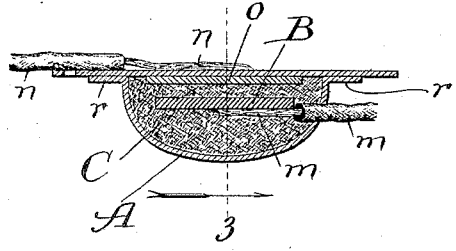
Figure 3:
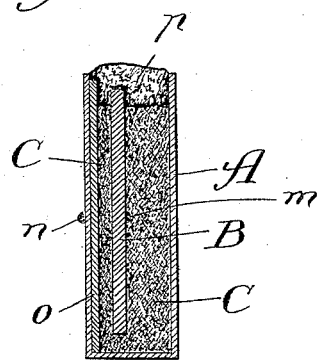

Figure 1 is a perspective view of a battery-cell constructed in accordance with my improvement. Fig. 2 is a transverse section taken on the line 2 of Fig. 1 and viewed in the direction of the arrow. Fig. 3 is a longitudinal section taken on the line 3 of Fig. 2 and viewed in the direction of the arrow.

The elements I prefer to use are zinc and carbon, though I do not limit myself to the same as the element-feature of my battery forms, in itself, no part of my invention, which I intend shall include any suitable combinations of elements. Nor do I desire to be understood as limiting my invention to any particular application, though it has been especially devised by me for use in an electric belt, for which the form illustrated in the drawings and hereinafter described is desirable.

A is the zinc element formed as a semi-cylindrical case provided along its opposite edges with flanges $r$, at which it is secured to a zinc base $q$ affording a flat surface at which it is adapted to be fastened on the flat surface of a belt (not shown). Within the case A is a flat carbon element B, enveloped by the excitant C, formed with my aforesaid compound, which may be filled into the case as a plastic mixture or be introduced therein as a powder and sufficient water then added to it to reduce it to a plastic mass. Both ends of the case are closed by any suitable means, as by means of zinc caps, though, as represented, the end through which the excitant is introduced is subsequently sealed with wax $p$; and to insulate the carbon from the zinc I paste a strip of insulating material, $o$, such as paraffined paper, between the two elements on the base $q$. An insulated conductor $n$ leads from the case A, say from the base thereof, and another leads from the element B, through the case, both to be connected with suitable terminals, as with the contact-plates of an electric belt.

What I claim as new and desire to secure by Letters Patent is—

1. An excitant compound for dry electric batteries comprising a mixture of a salt of calcium, a ferrous salt and a salt of hydrargyrum, substantially in the proportion specified.

2. A dry electric battery comprising, in combination, a positive element and a negative element and an excitant compound composed of a mixture, substantially in the proportions specified, of a salt of calcium, a ferrous salt, and a salt of hydrargyrum, substantially as described.

3. A dry electric battery comprising, in combination, a positive element and a negative element and an excitant compound composed of a mixture, substantially in the proportions specified, of sulphate of calcium, ferrous sulphate and hydrargyrum sulphate, substantially as described.

4. A dry electric battery comprising, in combination, a case A forming one element, an element B inside the case and insulated therefrom, and an excitant compound enveloping the element B in the case and composed of a mixture, substantially in the proportions specified, of a salt of calcium, a ferrous salt and a salt of hydrargyrum, substantially as described.

5. A dry electric battery comprising, in combination, a case A formed with a semi-cylindrical top and flat base, and forming one element, a carbon plate forming an element B inside and insulated from the case, and an excitant compound C enveloping the carbon inside the case and composed of a mixture, substantially in the proportions specified, of sulphate of calcium, ferrous sulphate and hydrargyrum sulphate, substantially as described.

CLARENCE H. BRYAN.

In presence of—
M. J. FROST,
J. N. HANSON.